US010014706B2

United States Patent
Loonen et al.

(10) Patent No.: US 10,014,706 B2
(45) Date of Patent: Jul. 3, 2018

(54) MODEL-BASED FAST-CHARGING METHOD BASED ON LITHIUM SURFACE CONCENTRATION

(71) Applicant: NXP B.V., Eindhoven (NL)

(72) Inventors: Koen Johan Frederik Loonen, Eindhoven (NL); Hendrik Johannes Bergveld, Eindhoven (NL)

(73) Assignee: NXP B.V., Eindhoven (NL)

( * ) Notice: Subject to any disclaimer, the term of this patent is extended or adjusted under 35 U.S.C. 154(b) by 84 days.

(21) Appl. No.: 15/161,989

(22) Filed: May 23, 2016

(65) Prior Publication Data

US 2017/0338667 A1 Nov. 23, 2017

(51) Int. Cl.
*H01M 10/44* (2006.01)
*H02J 7/00* (2006.01)
*H01M 10/0525* (2010.01)

(52) U.S. Cl.
CPC ......... *H02J 7/007* (2013.01); *H01M 10/0525* (2013.01); *H01M 10/44* (2013.01); *H01M 10/443* (2013.01); *H01M 10/446* (2013.01); *H01M 10/448* (2013.01)

(58) Field of Classification Search
USPC ...................................................... 320/107
See application file for complete search history.

(56) References Cited

U.S. PATENT DOCUMENTS

| | | | | |
|---|---|---|---|---|
| 6,441,586 B1 * | 8/2002 | Tate, Jr. | ............ | G01R 31/3648 320/132 |
| 8,427,112 B2 * | 4/2013 | Ghantous | ........... | G01R 31/3637 320/137 |
| 9,197,089 B2 * | 11/2015 | Choe | ........................ | H02J 7/007 |
| 2009/0259420 A1 * | 10/2009 | Greening | .............. | H01M 4/364 702/63 |
| 2009/0273320 A1 * | 11/2009 | Ungar | .................. | H01M 4/5815 320/162 |
| 2010/0000809 A1 * | 1/2010 | Nishi | ..................... | B60K 6/445 180/65.29 |
| 2010/0148731 A1 | 6/2010 | Notten et al. | | |
| 2011/0012563 A1 * | 1/2011 | Paryani | ............. | H01M 10/0525 320/162 |

OTHER PUBLICATIONS

Rapid Charging of Lithium-Ion Batteries Using Pulsed Currents, A Theoretical Analysis; Department of Chemical Energy, Cleveland Ohio, 2006, pp. 533-542 (2006).

(Continued)

*Primary Examiner* — Samuel Berhanu
*Assistant Examiner* — Tessema Kebede

(57) ABSTRACT

Disclosed is a method of charging a battery, including determining at a first time interval a current to be applied until a second time interval such that the current charges the battery so that an anode Li-ion surface concentration at the second time interval is kept smaller than or equal to a maximum Li-ion surface concentration of the anode, applying the current to the battery, and determining at the second time interval another current to be applied until a third time interval such that the another current charges the battery so that an anode Li-ion surface concentration at the third time interval is kept smaller than or equal to the maximum Li-ion surface concentration of the anode.

20 Claims, 6 Drawing Sheets

(56) References Cited

OTHER PUBLICATIONS

Barsukov, et al., "Battery Power Management for Portable Devices", Artech House, 2013.
Bergveld, et al., "Battery Management Systems", Design by Modeling, 2002.
Li, et al., "The Effects of Pulse Charging on Cycling Characteristics of Commercial Lithium-Ion Batteries", www.elsevier.com/locate/jposour, 2001, 302-309.
Manthiram, et al., "Chemical and Structural Instabilities of Lithium Ion Batteries Cathodes", Journal of Power Sources; Austin TX, 2006, 249-253.
Notten, et al., "Boostcharging Li-ion batteries: A Challenging New Charging Concept", Science Direct, Journal of Power Sources, Oct. 15, 2004, 89-94.
Verma, et al., "A Review f the Features and Analysis of the Solid Electrolyte Interprise in Li-ion Batteries", Electrochimica Acta 55, 2010, 6332-6341.
Chen, Liang-Rui et al.; "Sinusoidal-Ripple-Current Charging Strategy and Optimal Charging Frequency Study for Li-Ion Batteries"; IEEE Transactions on Industrial Electronics, vol. 60, No. 1; 10 pages (Jan. 2013).
Keskin, Nurcan et al.; "Fast Charging Method for Wireless and Mobile Devices using Double-Pulse Charge Technique"; 2014 IEEE Wireless Power Transfer Conference; pp. 44-47 (2014).
Liu, Yi-Hwa et al; "Search for an Optimal Rapid-charging Pattern for Li-Ion Batteries Using the Taguchi Approach"; IEEE Transactions on Industrial Electronics, vol. 57, No. 12; pp. 3963-3971 (Dec. 2010).
Liu, Yi-Hwa, et al; "Search for an Optimal Rapid charging Pattern for Lithium-Ion Batteries Using Ant Colony System Algorithm"; IEEE Transactions on Industrial Electronics, vol. 52, No. 5; pp. 1328-1336 (Oct. 2005).
Loonen, Koen; "Fast-Charging Algorithms for Lithium-Ion Batteries"; Department of Electrical Engineering, Eindhoven University of Technology, MSC. Graduation Paper; 13 pages (Oct. 5, 2015).

\* cited by examiner

US 10,014,706 B2

MODEL-BASED FAST-CHARGING METHOD BASED ON LITHIUM SURFACE CONCENTRATION

TECHNICAL FIELD

Embodiments described herein generally relate to techniques for charging a battery, including a method to fast charge a Lithium-ion (Li-ion) battery without leading to excessive aging.

SUMMARY

A brief summary of various embodiments is presented below. Some simplifications and omissions may be made in the following summary, which is intended to highlight and introduce some aspects of the various embodiments, but not to limit the scope of the embodiments described herein. Detailed descriptions of embodiments adequate to allow those of ordinary skill in the art to make and use the inventive concepts will follow in later sections.

Various embodiments described herein relate to a method of charging a battery including determining at a first time interval a current to be applied until a second time interval such that the current charges the battery so that an anode Li-ion surface concentration at the second time interval is kept smaller than or equal to a maximum Li-ion surface concentration of the anode, applying the current to the battery, and determining at the second time interval another current to be applied until a third time interval such that the another current charges the battery so that an anode Li-ion surface concentration at the third time interval is kept smaller than or equal to the maximum Li-ion surface concentration of the anode.

A concentration above the maximum Li-ion surface concentration may be one in which Li plating will occur.

The current may be determined to be less than or equal to the maximum current that is dictated by a charger.

Various embodiments described herein also relate to a method of charging a battery, including modeling a surface concentration of Li-ion at an anode surface of a battery based upon a Li-ion concentration at different locations in the battery and the present charging current, determining a maximum surface concentration current when applied from the first time instant to a second time instant leads to a maximum surface concentration at the second time instant, and charging the battery at an applied battery current using the maximum surface concentration current from the first time instant to the second time instant.

The method may include determining a lesser value between the maximum surface concentration current and a maximum allowed charge current to yield the applied battery current to charge the battery at a given time step.

A concentration vector may describe the concentration of Li-ions at different locations inside the battery.

One element of the concentration vector may be the surface concentration of the Li-ions at an anode. An amount of elements in the concentration vector may depend on an applied discretization of the battery model.

The method may include a model part in which a battery voltage is calculated as a function of the concentration vector and the applied battery current. A feedback loop may be constructed based on the calculated battery voltage. The concentration vector may be modified based on an observed difference between the calculated battery voltage and a measured battery voltage.

Various embodiments described herein also relate to a battery charging system including a battery management system configured to receive operating characteristics from a battery to be charged and determine a state of charge of the battery, a fast charge controller configured to receive the state of charge from the battery management system and determine charging information to charge the battery to prevent aging impact, and a battery charger configured to receive charging information from the fast charge controller and charge the battery using the charging information.

The charging information may include an optimum charge current.

The fast charge controller may determine at a first time interval the optimum charge current to be applied until a second time interval such that the optimum charge current charges the battery so that an anode Li-ion surface concentration at the second time interval is kept smaller than or equal to a maximum Li-ion surface concentration of the anode.

The charging information may include a controlled voltage level such that the battery is controlled to a constant value.

The operating characteristics may include at least one of current, voltage, and temperature.

BRIEF DESCRIPTION OF THE DRAWINGS

Additional objects and features of the embodiments described herein will be more readily apparent from the following detailed description and appended claims when taken in conjunction with the drawings. Although several embodiments are illustrated and described, like reference numerals identify like parts in each of the figures, in which:

DETAILED DESCRIPTION

Embodiments described herein include a method to charge a Lithium-ion (Li-ion) battery, without leading to excessive aging. Embodiments are based on a battery model that relates the charging current serving as a model input to Li concentration profiles inside the battery electrodes. The embodiments evaluate the charging at time steps to determine an optimal charging current that leads to a fastest possible charging process, without a calculated Li surface concentration crossing a certain defined threshold. In one embodiment, an optimal charge current may be calculated offline, and various optimal charge-current profiles for various starting state-of-charge (SoC) values may be stored in the charger. In another embodiment, an optimal charge current may be calculated online, i.e., while the battery is charging, using a model and based on the actual charge current and resulting calculated concentration profile. In yet another embodiment, the online calculation can be extended by using the modeled battery voltage to make model predictions more accurate based on compensating the model predictions as a result of an observed difference between predicted voltage and measured voltage.

Figure 1:
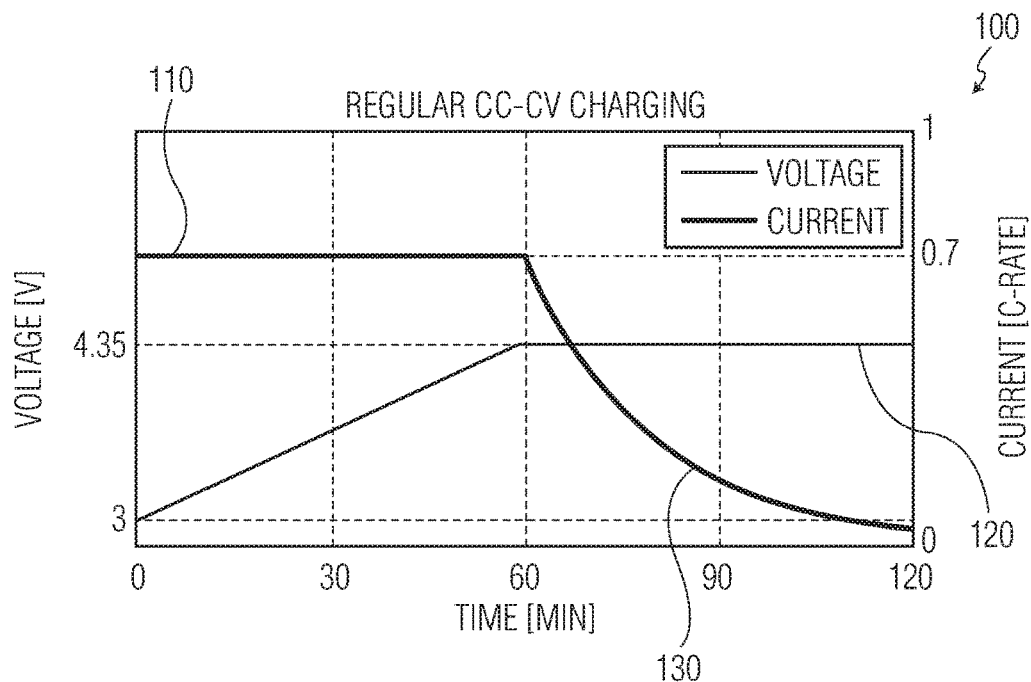
FIG. 1 illustrates a CC-CV charging profile of a Li-on battery in accordance with embodiments described herein.

FIG. 1 illustrates a related art CC-CV charging profile 100 of a Li-on battery in accordance with embodiments described herein. Li-ion batteries may be applied in mobile equipment due their high energy density, leading to a high battery capacity at low weight. Li-ion batteries may be charged with a Constant-Current-Constant-Voltage (CC-CV) charging profile.

A charging process may start with charging a battery with a constant current. Charging current may be related to battery capacity in the form of a C-rate, where a 1 C current is the current with which a fully charged battery is discharged in one hour. For example, for a 3 Amp-hour (3 Ah) battery, a 1 C charging current may correspond to 3 A. In practice, the charging current in the constant current (CC) phase may be chosen between 0.5 C and 1 C, where 0.7 C is illustrated in FIG. 1 at 110. A higher current value than 0.7 C may lead to excessive aging. After the battery voltage reaches a pre-determined level, for example, 4.35V in FIG. 1, the constant voltage (CV) mode may be entered. In this mode the voltage 120 may be kept constant. As a result, the effective charging current 130 may drop as the battery is charged further. The value of this charge current may be determined by the difference between the applied terminal voltage (4.35V in FIG. 1) and an internal equilibrium voltage, often referred to as Electro-Motive Force (EMF), divided by the internal battery impedance. Applying a higher voltage here may lead to excessive wear-out. The charging process as illustrated in FIG. 1 may last up to 2 hours for practical Li-ion batteries in mobile devices. Charging is usually ended when the charge current drops below a minimum value, e.g., below C/50, with a safety timer preventing the CV mode from lasting longer than required.

There is a goal towards faster charging than the charging profile illustrated in FIG. 1, such as charging a battery to, e.g., 80% within 30-45 minutes or even lower times. This ability could allow a user of a mobile device to use the device more often, since charging time is less. However, if this is implemented by simply increasing the current in CC mode and/or the voltage in CV mode, excessive aging will occur.

There may be several causes for accelerated aging. In one situation, a concentration ratio of Li-ions in a battery cathode material, e.g., $LiCoO_2$, can drop below 0.5, in that less than half of the possible sites for Li-intercalation are occupied with Li-ions. This may lead to material decomposition which implies irreversible capacity loss. In another example, components in the battery electrolyte may react with Li-ions forming layers on either of the electrodes. This may take Li-ions from the battery that can no longer participate in the intercalation process and also may increase the battery series impedance due to the resistivity of the formed layer. Also, increased surface concentration of Li-ions at the anode surface during charging may lead to the formation of metallic Li on the anode (often referred to as Lithium plating) or even to the formation of dendrites. In the latter case, these electrically conducting dendrites may puncture the separator, leading to potential shorting of the battery and to excessive heat generation and potentially dangerous situations (e.g., thermal runaway, where the generated heat leads to even more heat being generated since all reactions take place at a faster rate at higher temperature).

In many practical cases, since diffusion of Li-ions inside a battery's graphite anode is the rate-determining step, the formation of Li on the anode due to a too-high Li surface concentration during charging may be perceived as a cause of battery aging during fast charging. As a result, there is a desire for a fast charge method that leads to a decrease in charging time compared to regular CC-CV charging and that keeps the surface concentration of Li-ions at the anode surface under control by applying a proper charging current or voltage value.

Embodiments described herein include designs in which a charging current is modified based on a modeled value of the anode Li-ion surface concentration. This leads to the possibility to calculate an optimum, i.e. highest possible, charging current at each moment in time and for each battery state where the anode Li-ion surface concentration is kept below a defined maximum concentration. In accordance with embodiments described herein, a battery model may allow calculation of an optimum charge current in the form of a single equation each time step. The model may also predict the resulting battery voltage, which may be compared to the measured battery voltage in a control loop. As a result, a concentration profile may be calculated more accurately to make use of any perceived differences between calculated and measured battery voltage to adjust the estimated concentration profile and increase the performance of the fast charger. Embodiments described herein include a fast-charging method that is based on a battery model and where the modeled anode Li-ion surface concentration may be used to control the charging current. Embodiments include a Li-ion battery fast charger to charge a Li-ion battery as fast as possible, without increased aging effects caused by Li formation on the anode.

Figure 2:
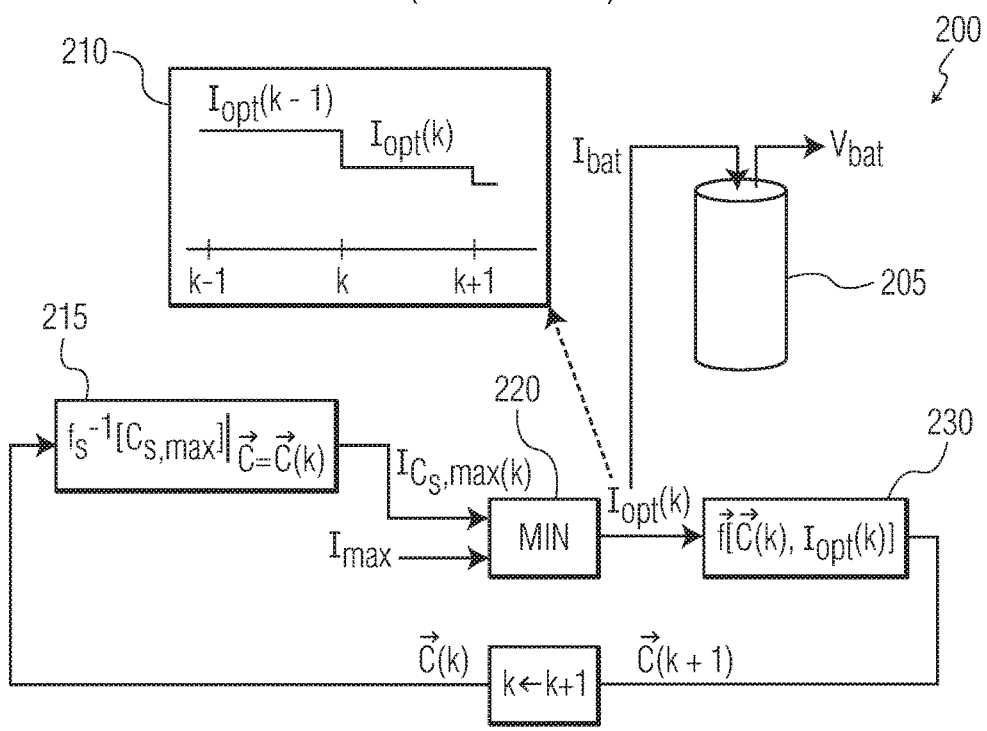
FIG. 2 illustrates a model-based optimization procedure to find optimum charging current in accordance with embodiments described herein.

FIG. 2 illustrates a model-based optimization procedure 200 to find optimum charging current in accordance with embodiments described herein. As illustrated in FIG. 2, at a time instant k, a highest optimum current $I_{opt}(k)$, which may be valid until the next time instant k+1, may be determined such that an anode Li-ion surface concentration at time instant k+1, $C_s(k+1)$, may be kept smaller than, up to, or equal to a defined maximum surface concentration $C_{s,max}$ (above which Li plating is expected to occur). Current $I_{opt}(k)$ is also determined to be less than, up to, or equal to the maximum current $I_{max}$ that is dictated by the charger.

Battery model $\vec{f}$ predicts a next concentration vector $\vec{C}(k+1)$, based on an initial concentration vector $\vec{C}(k)$ and current $I(k)$. The concentration vector $\vec{C}(k+1)$ may describe the concentration of Li-ions at different locations inside a battery 205. One element of the concentration vector $\vec{C}(k+1)$ is $C_s(k+1)$, the surface concentration of Li-ions at an anode. The amount of elements in the concentration vector $\vec{C}(k+1)$ depends on an applied discretization of a model. A higher level of discretization may imply more bins inside the two electrodes and inside the electrolyte and therefore may lead to more elements inside the concentration vector $\vec{C}(k+1)$. The surface concentration $C_s(k+1)$ can be calculated using one element of $\vec{f}$, namely $f_s$, where $f_s$ may calculate surface concentration $C_s(k+1)$ as a function of initial concentration vector $\vec{C}(k)$ and current $I(k)$: $C_s(k+1)=f_s(\vec{C}(k), I(k))$.

An inverse battery model $f_s^{-1}$ 215 takes the maximum surface concentration $C_{s,max}$ as an input, and is evaluated for $\vec{C}=\vec{C}(k)$, i.e., the complete concentration vector inside the battery model at time instant k. The result may be the maximum surface concentration current $I_{C_s,max}(k)$, which, if applied from t=k until t=k+1, leads to $C_s(k+1)=C_{s,max}$. Using a MIN block 220, the lesser of this current $I_{C_s,max}(k)$ and the maximum allowed charge current $I_{max}$ may be taken to yield $I_{opt}(k)$, which becomes the current $I_{bat}$ used to charge the battery 205 at a given time step. This current may be kept constant in the period from t=k until t=k+1, as is indicated in the inset 210 in the top-left-hand-side corner of FIG. 2. This process may be repeated for every time instant k.

Various embodiments using this model are possible. In an offline embodiment, an optimum current profile may be calculated offline, i.e, during charging of the battery 205, and programmed into a charger that may apply the programmed optimum current profile for actual charging without using any further feedback. In an online embodiment a charger may perform the optimization online, with or without taking the battery voltage into account.

Figure 3:
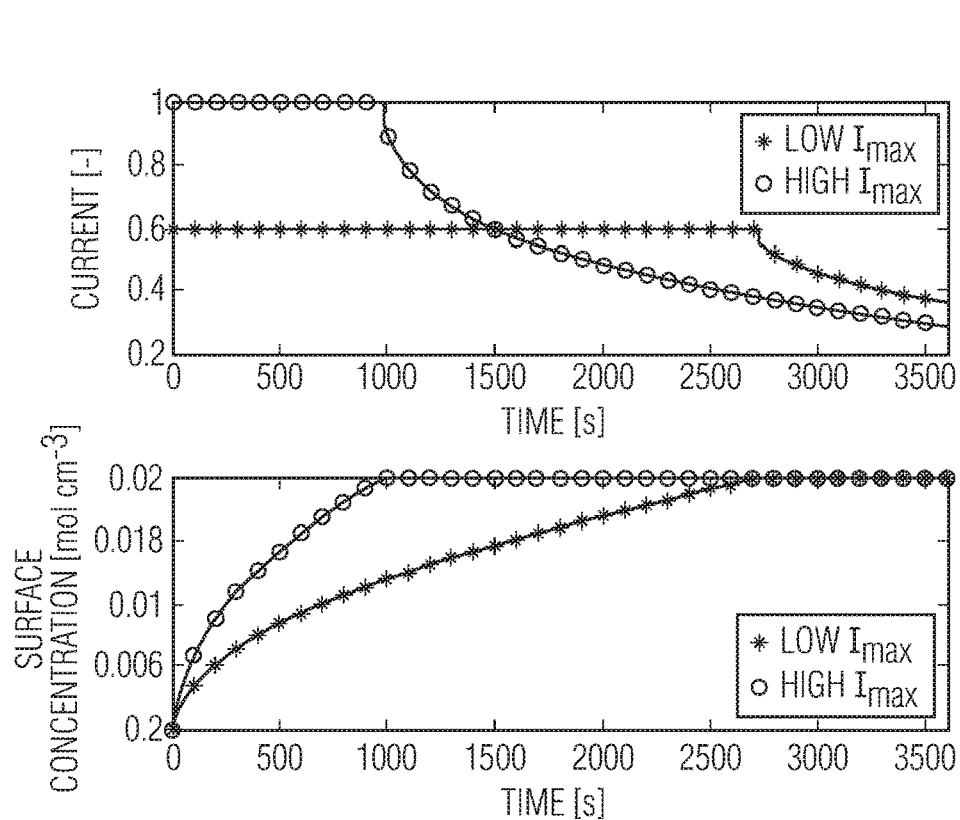
FIG. 3 illustrates a simulated charge current and Li-ion surface concentration applying the optimization procedure in accordance with FIG. 2.

FIG. 3 illustrates a simulated charge current and Li-ion surface concentration graph 300 applying the optimization procedure in accordance with FIG. 2. A simulated example of applying an optimization procedure illustrated in FIG. 2 for two values of $I_{max}$ (scale plotted relative to the highest of the two) and using a battery model tuned to a 300 mAh Li-ion cell is given in FIG. 3. Applying the optimization procedure of FIG. 2 implies that charging starts at current $I_{max}$ until maximum surface concentration $C_{s,max}$ (0.02 mol/cm$^3$ in this case) is reached. After that, the current may be lowered keeping $C_s$ constant at $C_{s,max}$. In FIG. 3, charging may occur from start to finish without interruption. There are several possible methods of dealing with interrupted charging and starting from different SoC values, each with advantages and disadvantages.

Figure 4:
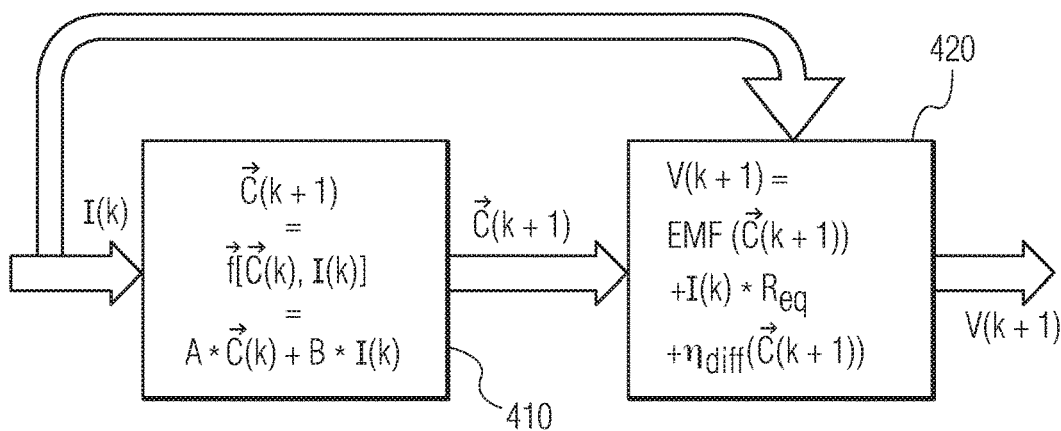
FIG. 4 illustrates a battery model used in accordance with embodiments described herein.

FIG. 4 illustrates a battery model used in accordance with embodiments described herein. Given a certain input current $I(k)$, a concentration profile $\vec{C}(k+1)$ for the next time step k+1 may be calculated based on the current $I(k)$ and a concentration vector $\vec{C}(k)$ built up until moment k using the equation: $\vec{C}(k+1)=\vec{f}[\vec{C}(k), I(k)]=A*\vec{C}(k)+B*I(k)$. This model part 410 is applied in the block 230 in FIG. 2. As illustrated in FIG. 4, a function $\vec{f}$ may be written in matrix form, where matrices A and B model how the concentration of Li-ions may be built up at various places inside a Li-ion battery. A resulting concentration vector $\vec{C}(k+1)$ and input current $I(k)$ (valid between time instances k and k+1 as shown in the inset 210 in FIG. 2) may also be used to calculate battery voltage $V(k+1)$ in the model part 420 according to the following equation:

$$V(k+1)=\text{EMF}(\vec{C}(k+1)+I(k)*R_{eq}+\eta_{diff}(\vec{C}(k+1)).$$

This calculated battery voltage $V(k+1)$ at time instant k+1 may depend on an equilibrium voltage $\text{EMF}(\vec{C}(k+1))$, an ohmic voltage drop caused by current $I(k)$ flowing through modeled resistance $R_{eq}$ and diffusion potential $\eta_{diff}(\vec{C}(k+1))$. The EMF of a battery may be a function of the SoC. Several methods exist for the determination of the SoC. The SoC depends on an overall concentration of Li-ions inside the anode. During charging Li-ions move from cathode to anode, thus the overall number of Li-ions present inside the anode, i.e. the overall concentration inside the anode, may directly determine the SoC. Several ways also exist to determine the EMF curve as a function of SoC for a battery, i.e. extrapolation, interpolation and voltage relaxation. The resulting modeled EMF-SoC curve can be used in the model part 420. Filling in the valid overall concentration of Li-ions inside the anode, i.e. part of vector $\vec{C}(k+1)$, in this modelled curve may yield the valid EMF at time instant k+1. Ohmic and small-time-constant effects like the build-up of kinetic over-potentials may be combined in an equivalent model resistance $R_{eq}$. Multiplying this modeled resistance with the value current $I(k)$ between time instants k and k+1 may yield the voltage due to ohmic and kinetic effects. Finally, Fick's law can be used to calculate the overall over-potential $\eta_{diff}(\vec{C}(k+1))$ caused by diffusion profiles of Li-ions inside the Li-ion battery model.

Figure 5:
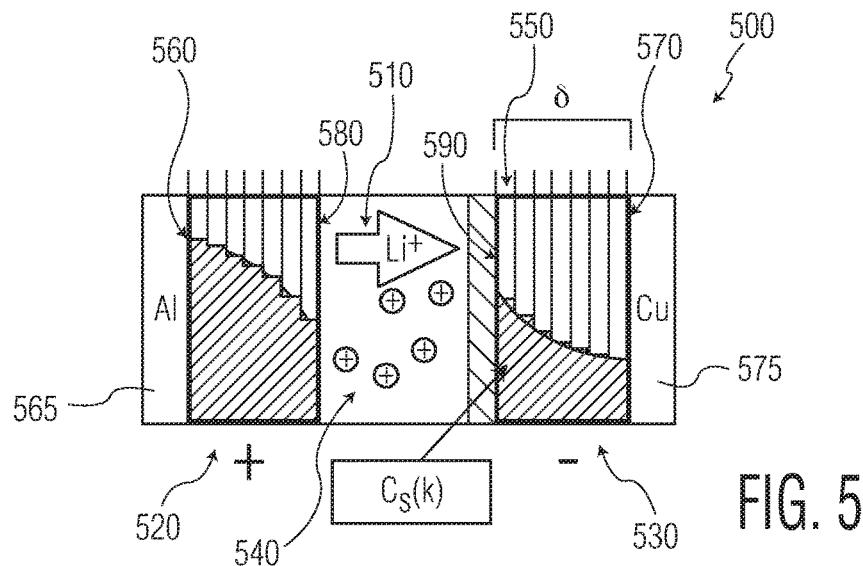
FIG. 5 illustrates a single-particle one-dimensional diffusion model in accordance with embodiments described herein.

FIG. 5 illustrates a single-particle one-dimensional diffusion model 500 in accordance with embodiments described herein. Concentrations of Li-ions 510 throughout a battery can be calculated in various ways. Positive electrode 520 and negative electrode 530 may have thicknesses δ and each may be subdivided into a number of slices, e.g. seven in this example, but embodiments are not limited thereto. The number of slices may be more or less, depending on the algorithm to be used for analysis. As illustrated, no diffusion is assumed to take place inside the electrolyte 540. That means that no concentration profile is present inside the electrolyte 540 and the voltage drop across it may be purely ohmic. In this case, a contribution of the electrolyte to the battery voltage may be taken into account in parameter $R_{eq}$ as illustrated in FIG. 4. As a result, concentration vector $\vec{C}(k)$ will have 14 elements in this case. Also, an occurrence of concentration profiles inside the electrolyte can easily be taken into account by distributing the electrolyte into a number of slices. The concentration in the first slice 550 of the negative electrode (anode) facing the electrolyte in the middle may represent the required surface concentration $C_s(k)$.

In each electrode, the diffusion over-potential caused by the concentration profile of Li-ions inside the electrode can be calculated based on the Li-ion concentration profiles that can be calculated based on Fick's law. For the positive electrode 520, a boundary condition holds at the interface 560 between the positive electrode 520 and an aluminum current collector 565, and holds at the interface 570 between the negative electrode 530 and the copper current collector 575, which means that Li-ions cannot cross the interfaces 560 and 570. On the cathode and anode electrode-electrolyte interfaces 580 and 590, respectively, a rate at which Li-ions cross this border is directly proportional to the overall battery current $I(k)$. In each positive electrode 520 and negative electrode 530 a diffusion over-potential resulting from the calculated diffusion profiles may be written in a Nernstian format, where the diffusion over-potential depends on the ratio between bulk (average concentration of Li-ions inside the electrode) and surface concentration. In a case where both are equal, no concentration profile may exist and the diffusion over-potential may be zero. Other battery models also exist, and embodiments described herein are not limited to the battery models illustrated in FIG. 4 and FIG. 5.

As described, electrolyte diffusion limitations may be added to the battery model. Moreover, non-linearities may be added as well as temperature dependence of the battery parameters. Adding temperature dependence in the charging algorithm may be beneficial because battery behavior may be highly temperature dependent and safety issues imply operating the battery at high temperatures is not allowed. As long as the battery model describes battery voltage and Li-ion anode surface concentration based on input current, it may be used to realize the embodiments described herein.

An embodiment labeled an offline open-loop implementation in accordance with the model illustrated in FIG. 2 may include the steps of (1) modeling the battery for which the fast charger is developed, for example based on FIG. 4 and FIG. 5, (2) using the optimization procedure of FIG. 2 to calculate the optimum charge current, and (3) applying this calculated current profile in the fast charger. In such a case, no battery model may be used in the charge controller. A memory may be used to store the required charge current profile. Also, the battery voltage may not be modeled. Because the SoC at the beginning of charging is not known, an optimum charge current profile as described herein may be stored for a number of starting SoC values. Otherwise, charging, for example, a half-full battery using the stored charging current profile for a battery that is charged from zero may lead to potential misuse, as the current would be too high leading to potential Lithium plating or other safety concerns.

In operation, in the charger, before starting the fast charging process, the SoC may be obtained from a Battery Management System (BMS) connected to the battery. Then, an appropriate charging current profile may be obtained from memory and charging can commence. In case the SoC value obtained from the BMS is not among the stored charging current profiles, the first curve with a higher SoC value should be used to avoid overcharging and damaging the battery.

Figure 6:
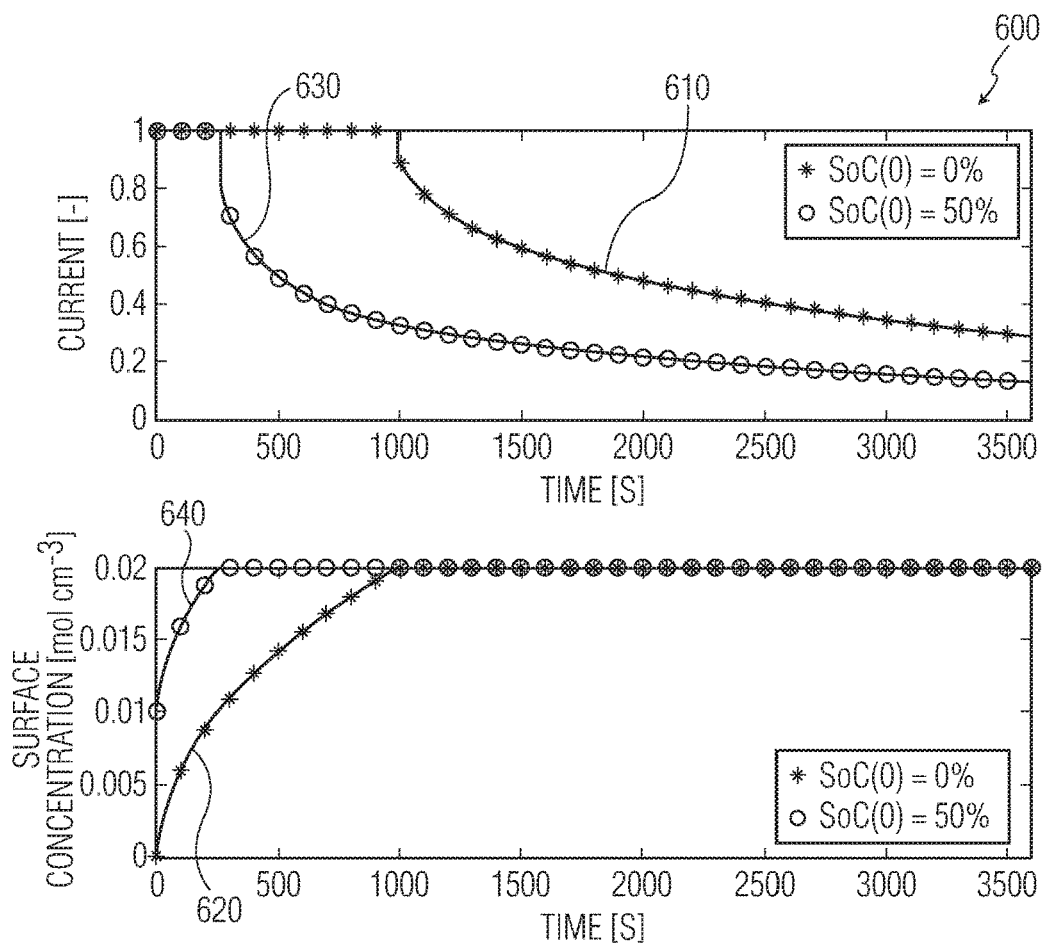
FIG. 6 illustrates a simulated example of two charging situations in accordance with FIG. 2.

FIG. 6 illustrates a simulated example 600 of two charging situations in accordance with FIG. 2. The curves 610 and 620 marked with stars for current and concentration profile have been obtained from using the optimization procedure of FIG. 2 on an empty battery (SoC=0%). The curves 630 and 640 marked with circles have been obtained starting from a half-full battery (SoC=50%). As illustrated in the graph, the current profiles differ. For the empty battery, a high current is maintained much longer before the limit concentration $C_{s,max}$ of 0.02 mol/cm$^3$ is reached. The integral of the charging current (area underneath the curve) is much higher for the case where charging is started from an empty battery.

In another embodiment, the optimization procedure illustrated in FIG. 2 including the battery model of FIGS. 4 and 5 may be implemented inside the charger. The embodiment may be called an online open-loop implementation. The part of the model where the battery voltage is described (model part 420 in FIG. 4) may be left out. For each time step the optimum charging current $I_{bat}$ fulfilling the conditions $I_{opt}(k) \leq I_{max}$ and $C_s(k+1) \leq C_{s,max}$ may be calculated and applied to the battery.

Applying the method of FIG. 2 may also imply that the concentration vector $\vec{C}(k)$ at each time instant k may now be known. Even if the charging current is interrupted, the concentration profiles may be calculated. Depending on the diffusion constants used in the calculation of the concentration profiles without externally applied current, the concentration profiles may level off and the diffusion over-potential may exponentially decrease to zero when bulk and surface concentrations are equal. Compared to an earlier embodiment, the SoC when starting charging may be automatically taken into account, because the bulk concentrations in both electrodes are continuously calculated online. Also, when current is re-started at any random moment after interruption of the charging current, the optimum charging current may be taken into account because concentration profiles are available at time instants k. For correct operation, the BMS may provide a starting SoC to calculate the initial bulk concentrations inside the model. The available SoC information from the BMS at later time instants may be used to calibrate the calculated bulk concentrations at regular time intervals.

Figure 7:
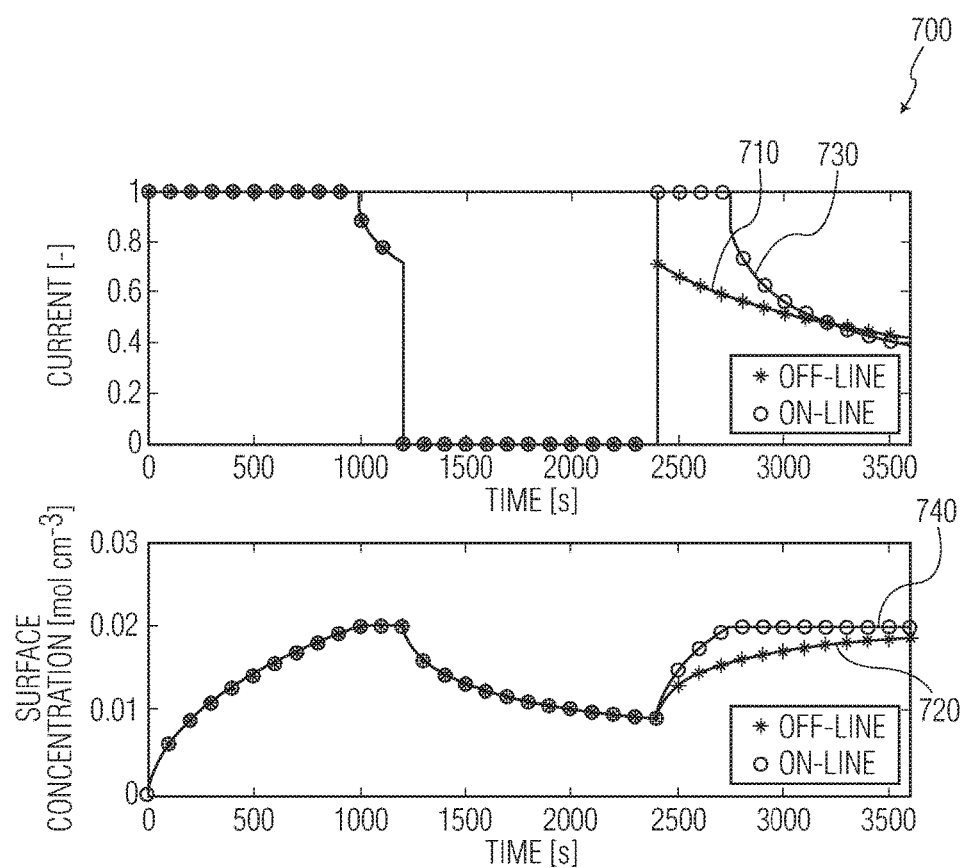
FIG. 7 illustrates a simulated comparison of applying an optimization procedure illustrated in FIG. 2 in an offline embodiment and in an online embodiment in accordance with embodiments described herein.

FIG. 7 illustrates a simulated comparison 700 of applying an optimization procedure illustrated in FIG. 2 in an offline embodiment and in an online embodiment in accordance with embodiments described herein. As illustrated in FIG. 7, a result of two embodiments described herein may be compared to determine a situation where charging from an empty battery is interrupted and later resumed. A curve 710 that represents charging current and curve 720 marked with stars are valid for the offline case, where a current profile is stored in the system, and the curves 730 and 740 marked with circles represent the online case, where a battery model may be used inside the charger to continuously calculate the optimum charging current based on continuously calculated concentration profiles.

As illustrated in FIG. 7, charging may start from an empty battery at time zero with a surface concentration zero. Until a charging current is interrupted at approximately 1200 seconds, both embodiments, offline and online, may yield the same results. In the online case and the offline case the concentration is continuously calculated. In the online case, the actual concentration amount may be available during the actual charging process. For the offline case, this may imply that whatever happens, when charging is resumed, automatically the rest of the charging current profile is applied based upon the pre-calculated profile. In FIG. 7A, the resumed charging current 710 after approximately 2400 seconds may be a continuation of the charging current profile interrupted at 1200 seconds. In the online case, the concentration may be known inside the charger at all time instants. When resuming charging at 2400 seconds, because the concentration profiles have become less steep (surface concentration has become more equal to the bulk concentration), the optimized charging current may actually be larger than before. In fact, for some time, charging can occur at $I_{max}$ without reaching the maximum surface concentration $C_{s,max}$. The result may be a faster overall charging process when the charging current is interrupted.

Figure 8:
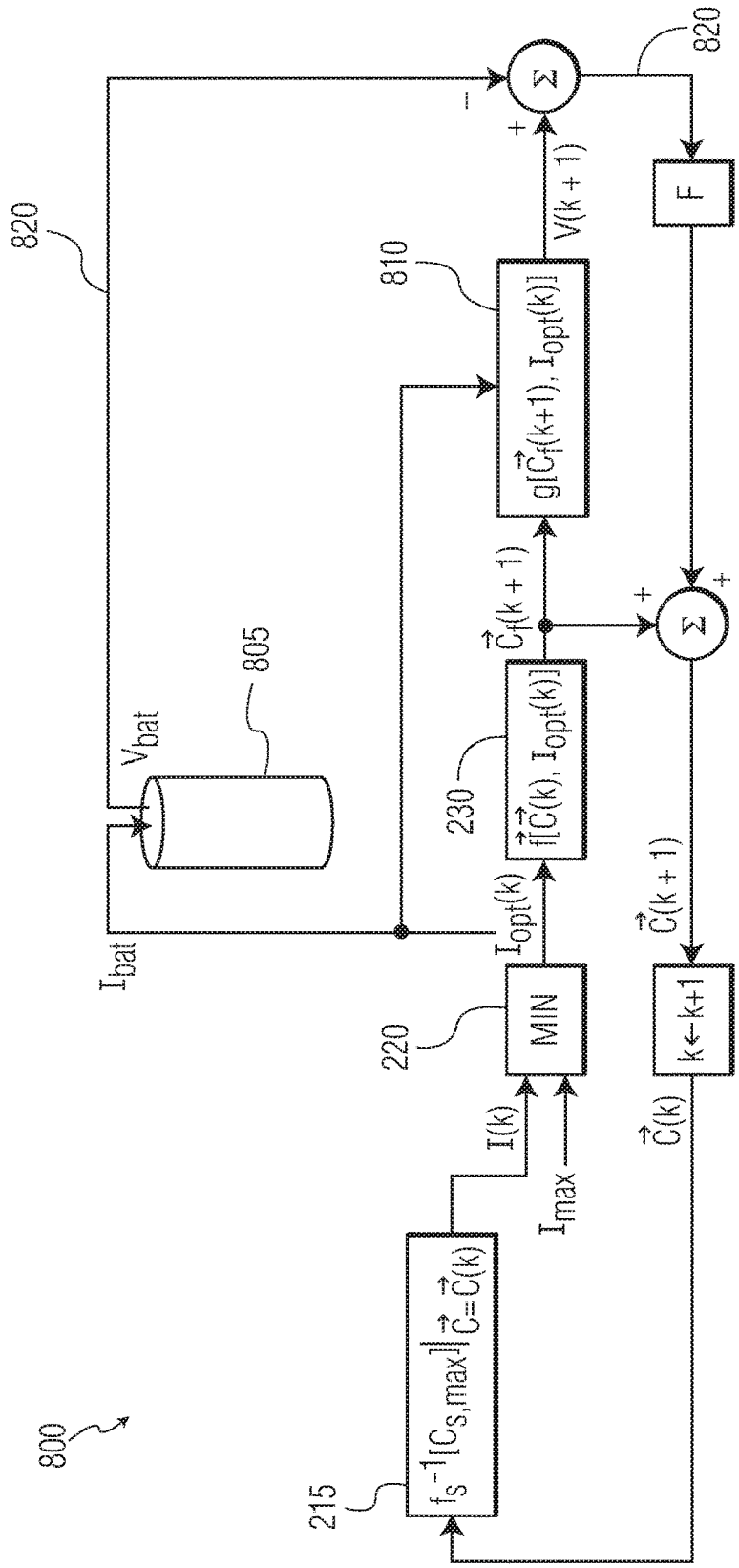
FIG. 8 illustrates another embodiment using battery voltage feedback in accordance with embodiments described herein.

FIG. 8 illustrates another embodiment 800 using battery voltage feedback. The embodiment may be called an online closed-loop implementation. As illustrated in FIG. 8, in addition to the regular battery model from FIG. 2 where the concentration vector at instant k+1 is calculated, a model part 420 (see FIG. 4) where the battery voltage of battery 805 is calculated as a function of this concentration vector as well as the applied battery current may be taken into account. Therefore, besides a function $\vec{f}[\vec{C}(k), I_{opt}(k)]$ in block 230 that calculates concentration vector $\vec{C}_f(k+1)$ based on concentration vector at instant k, $\vec{C}(k)$, and current $I_{opt}(k)$, also a function 810 $g[\vec{C}_f(k+1), I_{opt}(k)]$ may be used to calculate battery voltage V(k+1) based on concentration vector $\vec{C}_f(k+1)$ and current $I_{opt}(k)$.

Based on the calculated voltage V(k+1) a feedback loop 820 may be constructed. An observed difference between the calculated battery voltage (V(k+1)) and measured battery voltage ($V_{BAT}$) can be used to modify the calculated concentration vector $\vec{C}_f(k+1)$ into concentration vector $\vec{C}(k+1)$. Other components of the system are similar to FIG. 2. Using feedback, the estimated model output, i.e. the concentration of Li-ions throughout the battery 805, can be made more accurate. As a result, the calculated current I(k) will be more accurate because it is calculated in the inverse battery model based on the valid concentration vector $\vec{C}(k)$.

The battery model, feedback filter F and resulting estimation $\vec{C}(k+1)$ may be implemented using a Kalman filter. Several different embodiments are possible. In a Kalman filter, by defining its characteristics, the available modelled and measured information can be stressed differently. For example, by putting extra emphasis on an available SoC estimation from the BMS, the bulk concentration may be kept in accordance with this available SoC estimation. As discussed above, there is a clear link between bulk concentration in the anode and the SoC. Because the total number of available Li ions determines the maximum capacity, also the bulk concentration in the cathode may be known once the bulk concentration in the anode, directly linked to SoC, is known. By limiting the possible values of the bulk concentrations based on the available SoC value, the system may yield a more accurate result, because there may be multiple possible concentration profiles to provide the same battery voltage output of the model.

As illustrated in FIGS. 2 and 8, a fast charging a Li-ion battery is described where the battery is charged as fast as possible, while limiting the surface concentration on the anode surface. This may prevent excessive aging otherwise associated with charging with higher currents.

Embodiments described herein include a battery model including an inexpensive memory inside the charger to store charging profiles. Another embodiment applies voltage feedback to increase the accuracy of the system.

In online embodiments described herein, an optimum charge current at each moment in time may be determined. Embodiments may start from each SoC value, also when charging is interrupted and for chargers with different $I_{max}$ values.

Embodiments described herein may address one of the sources of aging when applying fast charging, i.e., lithium plating and dendrite formation on an anode. Embodiments described herein may do so using a battery model with an inexpensive implementation, and several extension possibilities. For example, before starting the fast-charging process as described herein, based on the measured $V_{BAT}$ value, pre-charging at a low current of, e.g., 0.1 C may be applied until $V_{BAT}$ passes a defined threshold value of, e.g., 3V, after which fast charging as described herein can commence. When $V_{BAT}$ reaches another predefined value, e.g., 4.35V, a CV region as illustrated in FIG. 1 can be implemented to control the end of the charging process. Implementing such a CV mode may also help to deal with an impact of any modelling inaccuracies. As a safety precaution, the value of $V_{BAT}$ should be measured during charging to prevent its value being outside safety boundaries. In such a case, charging may either be terminated (high $V_{BAT}$) or proceed at a very low level (low $V_{BAT}$). In the latter case, an occurrence of any short-circuit condition should also be checked, which is standard practice in any battery charger.

Figure 9:
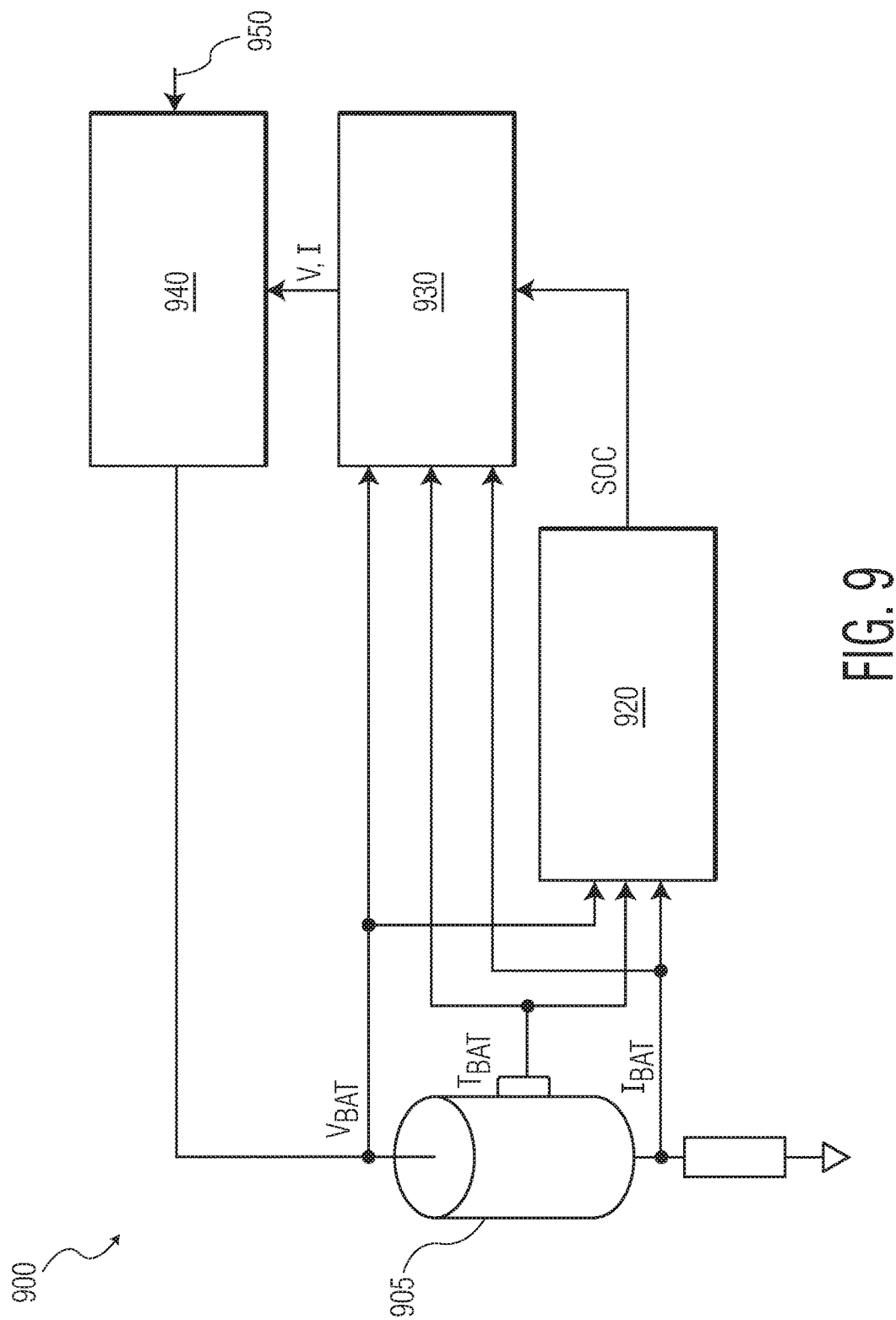
FIG. 9 illustrates an embodiment of a battery charger system in accordance with embodiments described herein.

FIG. 9 illustrates an embodiment of a battery charger system 900 in accordance with embodiments described herein. A battery 905 to be charged and discharged may have various output characteristics such as battery voltage $V_{BAT}$, battery current $I_{BAT}$ and battery temperature $T_{BAT}$. These output characteristics are measured and used as input for a general battery management system 920 and a fast-charge controller 930. The battery management system 920 uses inputs $V_{BAT}$, $I_{BAT}$ and $T_{BAT}$ to assess the battery 905 status, in order to determine the State-of-Charge (SoC) of the battery 905. This SoC value is output to the fast-charge controller 930. Based on the SoC, $V_{BAT}$, $I_{BAT}$, and $T_{BAT}$ the fast-charge controller 930 determines charging information including the optimum charge current to charge the battery 905 as fast as possible without aging impact, as described herein. The SoC may be used for any of the embodiments described herein as a starting point for charging. Whether or not $V_{BAT}$ and $T_{BAT}$ are used depends on how the fast-charge controller 930 is used. In an example embodiment, $V_{BAT}$ may be used to tune the model results using feedback, and $T_{BAT}$ may be used to include a temperature dependence of the battery 910 behavior in the model. The fast-charge controller 930 determines the optimum charge current and sends a command to a battery charger 940 to ensure the battery 905 is charged with the optimum charge current from moment k to k+1, as discussed herein. The battery charger 940 is powered by a power source 950. In case the CV mode is included at the end of charging, the charging information can also include a voltage level, and the battery charger 940 can also be controlled to that voltage, such that the battery 905 voltage is controlled to a constant value.

Although the various embodiments have been described in detail with particular reference to certain aspects thereof, it should be understood that the embodiments described herein are capable of other embodiments and its details are capable of modifications in various obvious respects. As is readily apparent to those skilled in the art, variations and modifications can be effected while remaining within the spirit and scope of the embodiments described herein. Accordingly, the foregoing disclosure, description, and figures are for illustrative purposes only and do not in any way limit the embodiments described herein, which is defined only by the claims.

The invention claimed is:

1. A method of charging a battery, comprising:
determining at a first time interval a first charging current to be applied until a second time interval such that the first charging current charges the battery so that an anode Li-ion surface concentration at the second time interval is kept smaller than or equal to a maximum Li-ion surface concentration of the anode that is used to determine a first maximum Li-ion surface concentration current, wherein the first charging current is the lesser of the first maximum Li-ion surface concentration current and a maximum allowed charge current during the first time interval;
applying the first charging current to the battery;
determining at the second time interval another charging current to be applied until a third time interval such that the another charging current charges the battery so that an anode Li-ion surface concentration at the third time interval is kept smaller than or equal to the maximum Li-ion surface concentration of the anode that is used to determine a second maximum Li-ion surface concentration current, wherein the another charging current is the lesser of a second maximum Li-ion surface concentration current and a maximum allowed charge current during the second time interval; and
applying the another charging current to the battery.

2. The method of claim 1, wherein a concentration above the maximum Li-ion surface concentration is one in which Li plating will occur.

3. The method of claim 1, wherein the first current and the another current are determined to be less than or equal to the maximum current that is dictated by a charger.

4. A method of charging a battery, including:
modeling a surface concentration of Li-ion at an anode surface of a battery based upon a Li-ion concentration at different locations in the battery and a present charging current;
determining up to a maximum Li-ion surface concentration current when applied from the first time instant to a second time instant leads up to a maximum Li-ion surface concentration at the second time instant; and
charging the battery at an applied battery current using up to the maximum Li-ion surface concentration current from the first time instant to the second time instant.

5. The method of claim 4, comprising determining a lesser value between the maximum Li-ion surface concentration current and a maximum allowed charge current to yield the applied battery current to charge the battery at a given time step.

6. The method of claim 4, wherein a concentration vector describes the concentration of Li-ions at different locations inside the battery.

7. The method of claim 6, wherein one element of the concentration vector is the surface concentration of the Li-ions at an anode.

8. The method of claim 6, wherein an amount of elements in the concentration vector depends on an applied discretization of the battery model.

9. The method of claim 6, comprising a model part in which a battery voltage is calculated as a function of the concentration vector and the applied battery current.

10. The method of claim 9, comprising constructing a feedback loop based on the calculated battery voltage.

11. The method of claim 9, wherein the concentration vector is modified based on an observed difference between the calculated battery voltage and a measured battery voltage.

12. A battery charging system, comprising:
a battery management system configured to receive operating characteristics from a battery to be charged and determine a state of charge of the battery;
a fast charge controller configured to receive the state of charge from the battery management system and determine charging information to charge the battery to prevent aging impact; and
a battery charger configured to receive charging information from the fast charge controller and charge the battery using the charging information, wherein the fast charge controller determines at a first time interval the charging information to be applied until a second time interval such that the charging information charges the battery so that an anode Li-ion surface concentration at the second time interval is kept smaller than or equal to a maximum Li-ion surface concentration of the anode, wherein the charging information is the lesser of a maximum Li-ion surface concentration current and a maximum allowed charge current during the first time interval.

13. The battery charging system of claim 12, wherein the charging information includes an optimum charge current.

14. The battery charging system of claim 12, wherein the charging information comprises a controlled voltage level such that the battery is controlled to a constant value.

15. The battery charging system of claim 12, wherein the operating characteristics comprise at least one of current, voltage, and temperature.

16. The battery charging system of claim 12, wherein a concentration above the maximum Li-ion surface concentration is one in which Li plating will occur.

17. The battery charging system of claim 12, wherein a concentration vector describes a concentration of Li-ions at different locations inside the battery.

18. The battery charging system of claim 17, comprising a model part in which a battery voltage is calculated as a function of the concentration vector and the applied battery current.

19. The battery charging system of claim 18, comprising constructing a feedback loop based on the calculated battery voltage.

20. The battery charging system of claim 18, wherein the concentration vector is modified based on an observed difference between the calculated battery voltage and a measured battery voltage.

* * * * *